Jones & Farquharson.
Bleaching Paper.

No. 2,384. Reissued Oct. 23, 1866.

Witnesses:
Jas. L. Ewin
W. F. Hall

Inventor
H. L. Jones
D. S. Farquharson
By Munn & Co
Attorneys

N. PETERS, PHOTO-LITHOGRAPHER, WASHINGTON, D. C.

UNITED STATES PATENT OFFICE.

THE HYDROSTATIC PAPER COMPANY, OF ROCHESTER, N. Y., ASSIGNEES, BY MESNE ASSIGNMENTS, OF HENRY L. JONES AND DUNCAN S. FARQUHARSON.

IMPROVED APPARATUS FOR BLEACHING PAPER-PULP.

Specification forming part of Letters Patent No. 53,152, dated March 13, 1886; Reissue No. 2,384, dated October 23, 1866.

*To all whom it may concern:*

Be it known that HENRY L. JONES and DUNCAN S. FARQUHARSON, both of Rochester, in the county of Monroe and State of New York, have invented a new and Improved Process for Bleaching Material for Paper-Pulp; and I do hereby declare the following to be a full, clear, and exact description of the same, reference being had to the accompanying drawings, which are made part of this specification, and in which—

Figure 1:
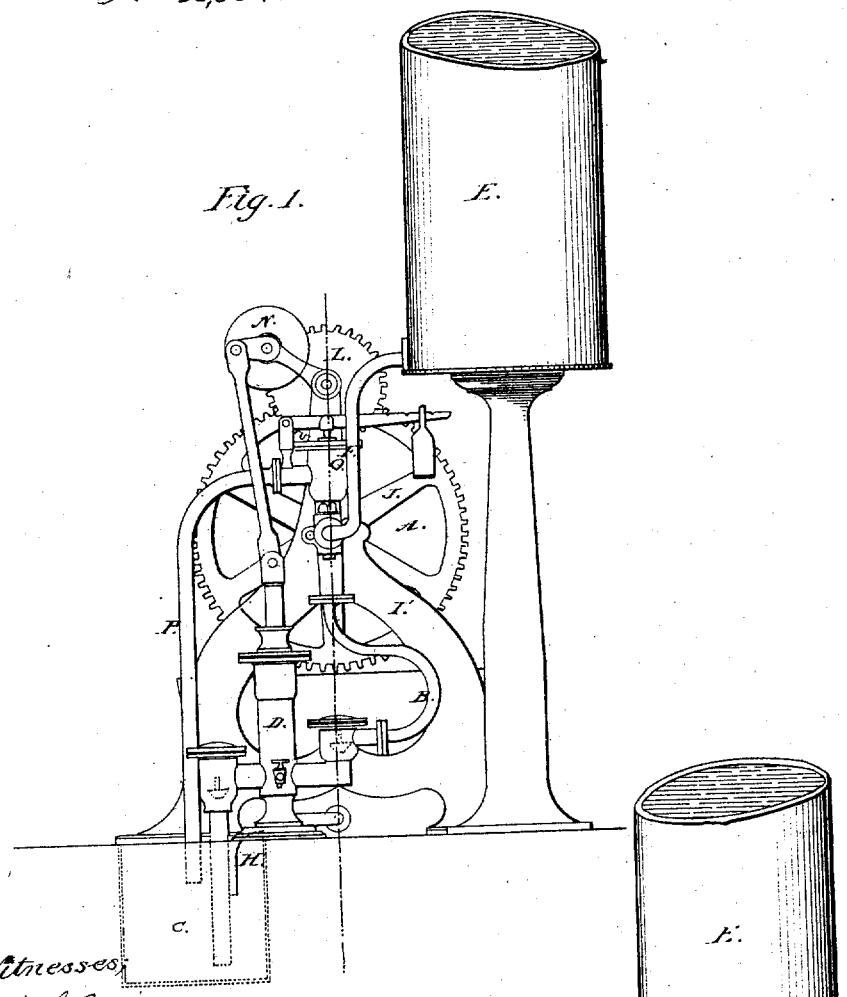
Figure 2:
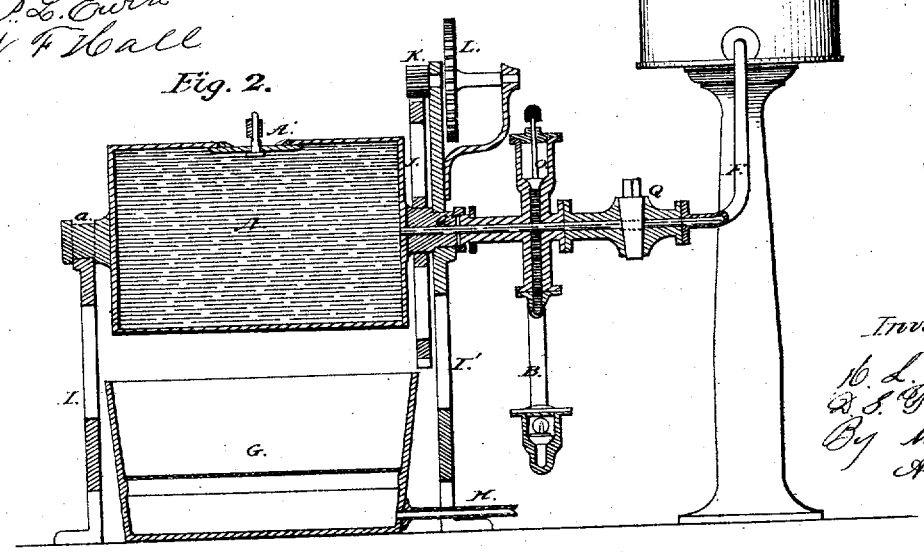

Figure 1 is an end elevation of an apparatus representing the invention. Fig. 2 is a vertical longitudinal section of the same.

Similar letters of reference indicate corresponding parts in the two figures.

The said invention consists, essentially, in bleaching straw, rags, woody fiber, or other material susceptible of conversion into paper, by subjecting such material to pressure from the liquid which contains the bleaching substance in solution.

The material to be bleached, after being reduced and prepared in the customary manner, is placed in a hollow cylinder or other suitable vessel, which receives the bleaching-liquid, which is forced into the said cylinder from a pump or otherwise, so that it shall exert considerable pressure upon the material within the cylinder; or the material may be placed in the cylinder or vessel, which may then be filled or nearly filled with the bleaching liquid. The necessary pressure may then be secured by forcing into the cylinder or vessel any liquid, or even air itself, or it may be secured by any mechanical appliance by which a sufficient pressure of the bleaching liquid upon the material can be obtained while the chemical action (usually denominated "bleaching") is taking place. The amount of pressure requisite will vary in accordance with the material to be bleached and the strength of the bleaching liquid, but it will be found that an increase of pressure will effect a corresponding saving in the strength of the bleaching liquid required.

In order that others skilled in the art to which the invention appertains may be enabled to fully understand and use the same, we will proceed to describe it in detail in connection with one form of apparatus whereby it may be carried into effect.

In the drawings, A represents a hollow cylinder, into which the material to be bleached is placed after it has been prepared or reduced in the ordinary way. B represents a pipe, through which the cylinder A communicates with the vat or vessel C containing the liquid, which is forced from the vat through the pipe B and into the cylinder A by means of a force-pump, D, which may be operated by steam. In this way the bleaching liquid is forced into the cylinder A under great pressure, so that the material to be bleached is thoroughly impregnated or mingled with the bleaching liquid, and the action of the latter is rendered much more efficient and quick than it is under the ordinary process.

If preferred the liquid may be supplied to the cylinder from an elevated reservoir or vat, E, which is supported at a suitable height to insure the necessary pressure, and made to communicate with the cylinder A through the pipe F.

The material to be bleached is introduced into the cylinder A through a man-hole at A′, and through the latter the contents of the cylinder are discharged after the bleaching has been completed, the whole being deposited into a vat, G, with a false bottom. The pulp remains in the vat G, while the liquid runs through its perforated bottom and returns to the vat C through the pipe H.

An apparatus consisting of the above-described parts, or their equivalents, is all that is necessary in carrying out our invention; but we will now proceed to describe devices which perform certain functions which render the operation of the apparatus more perfect.

The cylinder A is mounted upon standards I I′, and is supported by journals *a a′*, the latter *a′* of which is made hollow to receive the branch of the pipe which constitutes a continuation of the pipe leading from the vat C or E. J is a spur-gear keyed upon the journal *a′*, and rotated by a pinion, K, fixed upon the end of a short shaft, which is suitably supported at the top of the standard I′, and also carries a spur-gear, L, which receives rotary motion from a pinion upon the same shaft as the pulley N, to which power may be applied from an engine to operate the pump. Hence, as the pulley N is rotated during the operation of the pump, the above-described gearing communicates motion to the cylinder A, whose rotation produces an agitation of its contents, and thus exposes all the parts of the pulp to the liquid as soon as the operation of the apparatus is initiated.

A safety-valve at O, held down by an adjustable weight, is raised when the hydrostatic pressure becomes of an over-excessive character, and when the safety-valve O is thus raised a secondary valve is opened, which allows the liquid to return to the vat C through a pipe, P. The pipe leading from the elevated vat is opened and closed at will by means of the cock Q.

It is needless to specify all the different means by which this invention can be advantageously carried out; but we state specifically that we do not intend to limit ourselves to any particular apparatus, but propose to avail ourselves of such modifications as may be found desirable.

Having thus described the invention, the following is what we claim and desire to secure by Letters Patent:

1. Bleaching the material to be converted into paper by subjecting the same to the action of bleaching liquor applied under pressure, substantially as described.

2. The combination, with the cylinder A, of the pump D and pipe B, substantially as and for the purpose set forth.

3. The combination, with the cylinder A, of the elevated reservoir E and pipe F, substantially as and for the purposes set forth.

4. In combination with the cylinder A, pump D, and pipe P, the valve O, for relieving the pressure of the liquid, as explained.

THE HYDROSTATIC PAPER CO.,
By J. O. WOODRUFF,
*Its President.*

In presence of—
DE L. CRITTENDEN,
EDWARD S. YOUNG.